T. Holland,
Lubricator.
N°83,965. Patented Nov. 10, 1868.
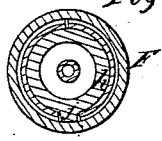
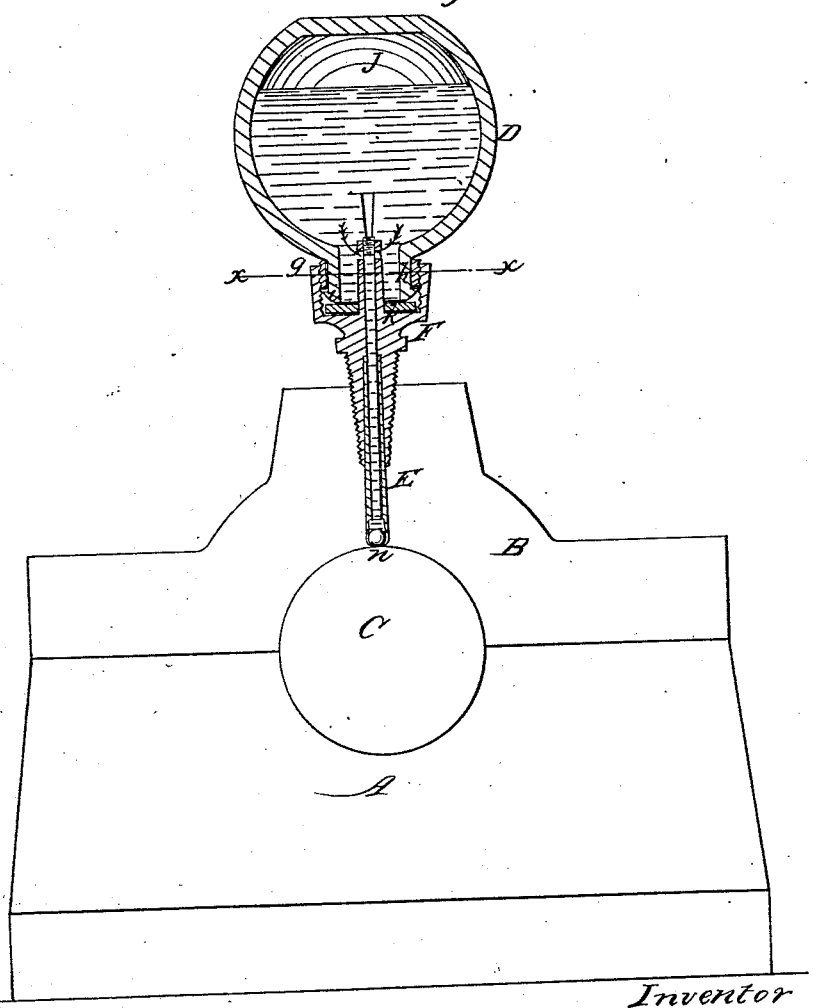
Witnesses
A Benrackendorf
Am A Mayar
Inventor
T. Holland
per Munn & Co
Attys

United States Patent Office.

TIMOTHY HOLLAND, OF NEW YORK, N. Y.

Letters Patent No. 83,965, dated November 10, 1868.

LUBRICATOR.

The Schedule referred to in these Letters Patent and making part of the same.

*To all whom it may concern:*

Be it known that I, TIMOTHY HOLLAND, of the city, county, and State of New York, have invented a new and useful Improvement in Lubricators; and I do hereby declare that the following is a full, clear, and exact description thereof, which will enable those skilled in the art to make and use the same, reference being had to the accompanying drawings, forming part of this specification.

This invention relates to useful improvements in vessels for lubricating journals with oil or other lubricating-liquid, whereby the ordinary glass lubricator is rendered more efficient than it has hitherto been.

The invention consists in the combination of a loose screw-threaded metallic collar, placed upon the neck of the glass oil-holder, and a projecting glass rib formed upon said neck to prevent the collar from turning when the tube is screwed on.

In the accompanying sheet of drawings—

Figure 1 represents a vertical central section of an oiler, constructed according to my invention, applied to a journal-box, with the ball resting on the journal.

Figure 2 is a cross-section of fig. 1, through the line $x\,x$.

Similar letters of reference indicate corresponding parts.

A B represent the journal-box.

C is the journal.

D is the glass oil-holder.

E is the oiler-tube, which is adjustable in the cap of the oiler, as it is made to slide out and in, as seen in the drawing.

F is the oiler-cap, which screws on to the screw-threaded collar $g$, on the neck of the oiler.

This collar, $g$, may be formed of a ring cut open and sprung on to the neck, or made in two or more segments, and placed on the neck $h$ of the oiler, under the lip $i$, so that it shall be prevented from turning when the cap is screwed on by the rib $j$, as seen.

$k$ is a rubber packing-ring, to insure a tight joint at the end of the glass neck.

The end of the neck is bevelled off for the purpose of more readily indenting the rubber packing.

The aperture near the discharge-end of the tube E is enlarged so as to form a chamber, in which is placed loosely a ball, $n$. It is retained in the chamber, when the oiler is in use, by resting on the journal, as seen. When the oiler is detached, it is kept in the chamber by the lip, which is turned over on the end of the tube. As the journal revolves, the ball revolves, and distributes the oil uniformly, and prevents friction on the journal.

The air-vacuum J in the oil-holder, in this description of lubricator, is overcome by the vacuum produced by the motion of the revolving journal, so that the oil is drawn down when the journal is in motion, and is retained by the vacuum J when the journal is at rest.

I claim as new, and desire to secure by Letters Patent—

The combination of the rib $j$ on the neck of the oil-holder D and the collar $g$, formed and applied as described, substantially as and for the purposes set forth.

The above specification of my invention signed by me, this 11th day of September, 1868.

TIMOTHY HOLLAND.

Witnesses:
FRANK BLOCKLEY,
ALEX. F. ROBERTS.